UNITED STATES PATENT OFFICE.

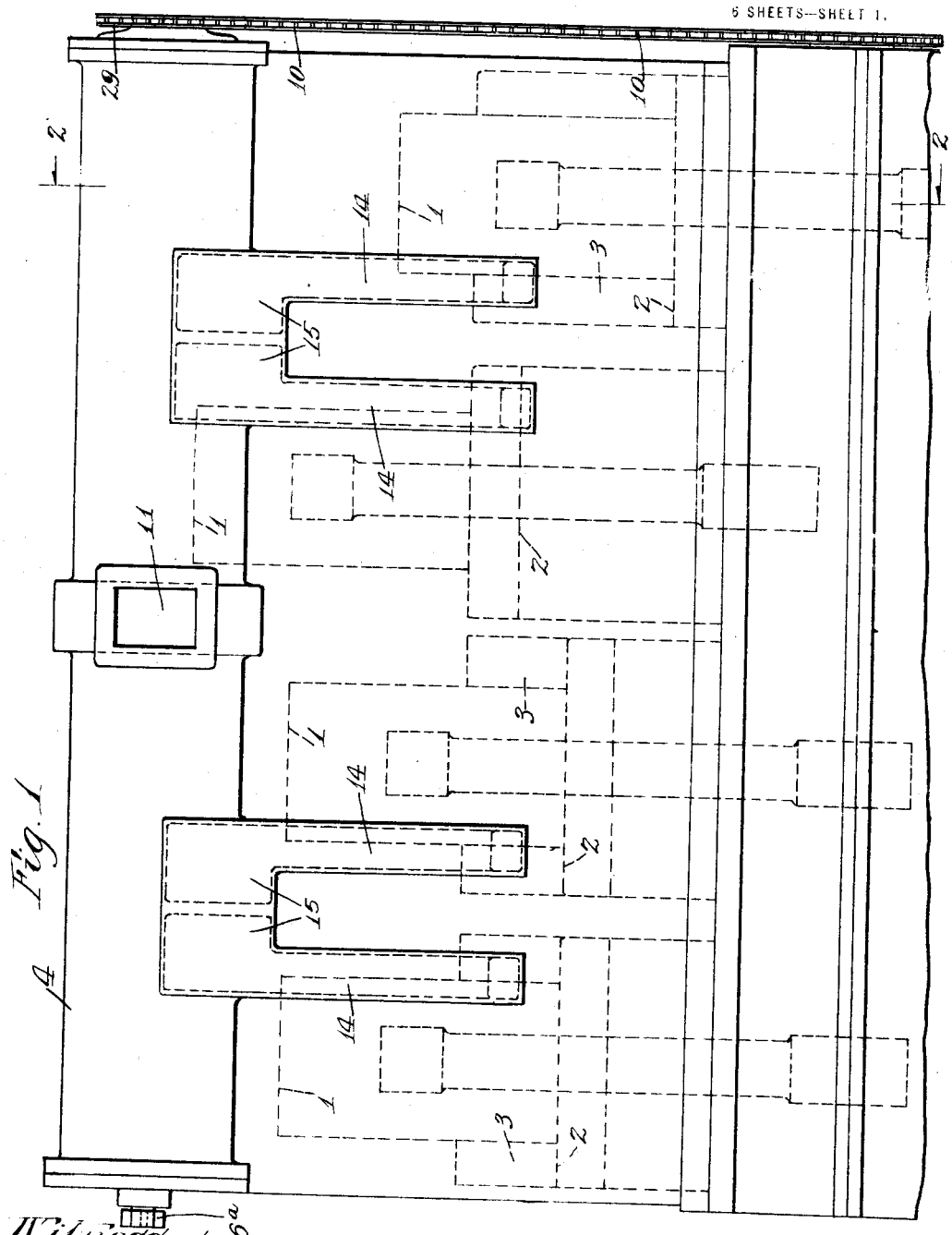

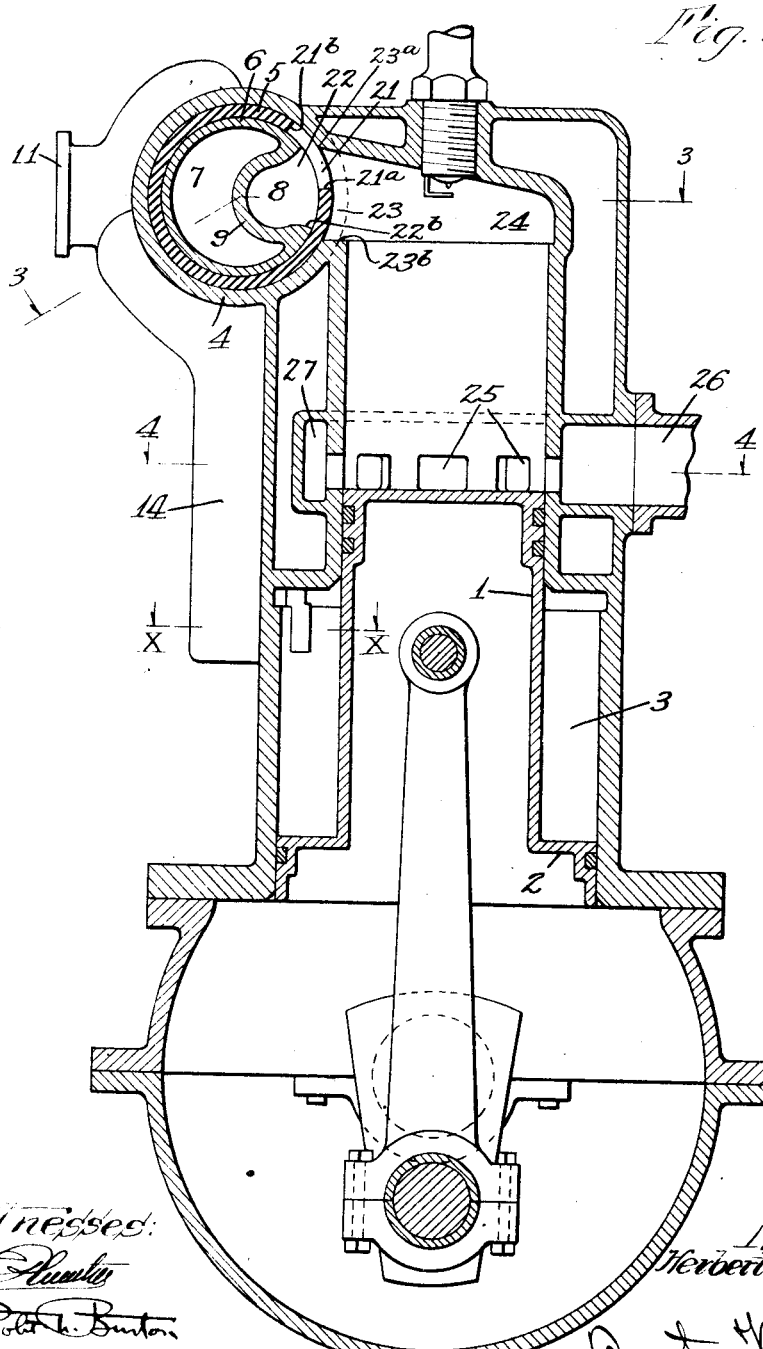

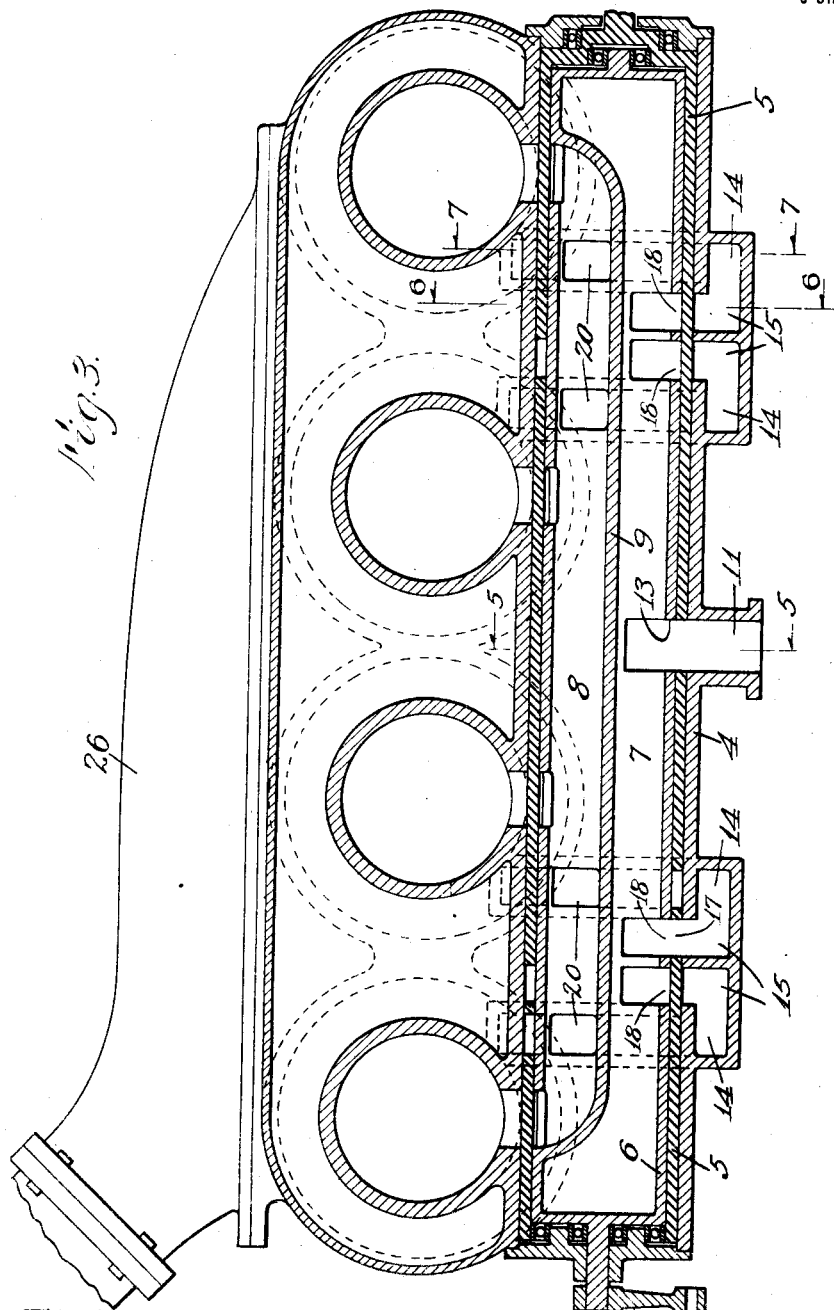

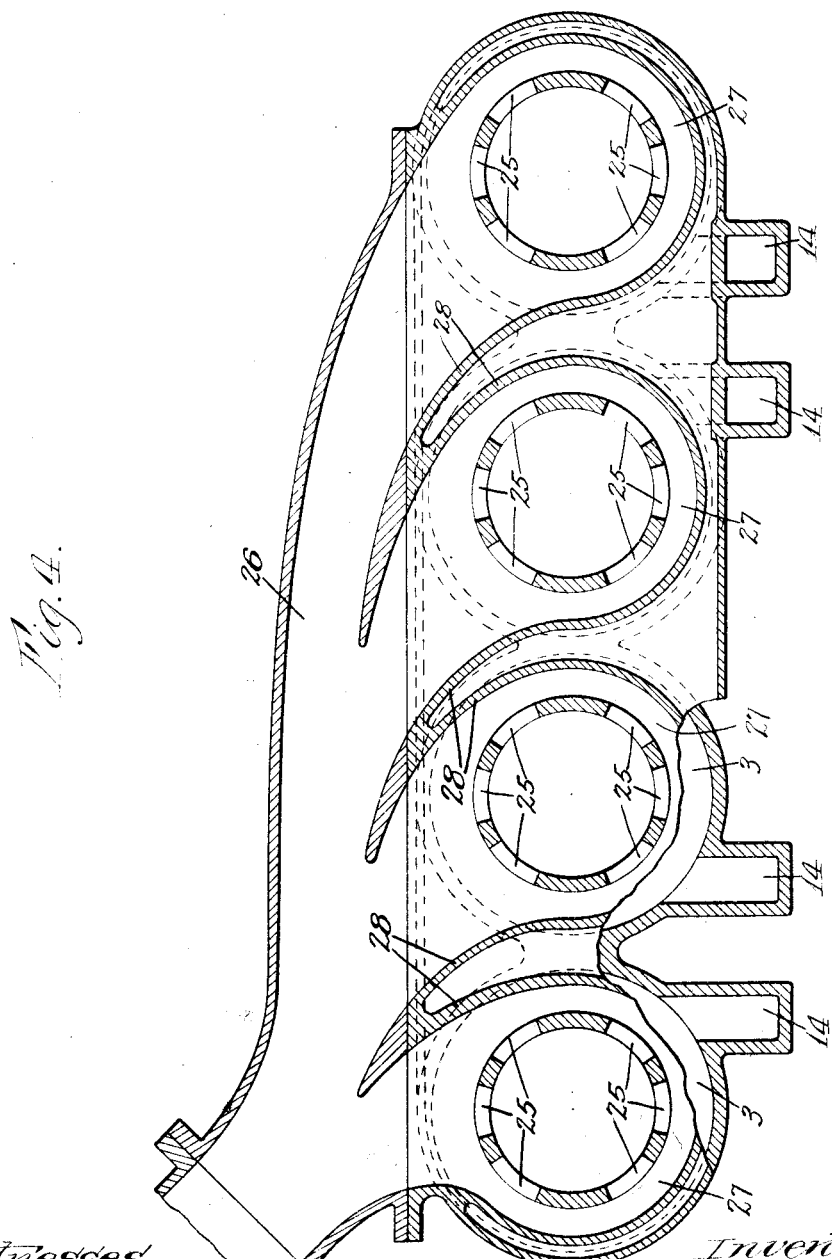

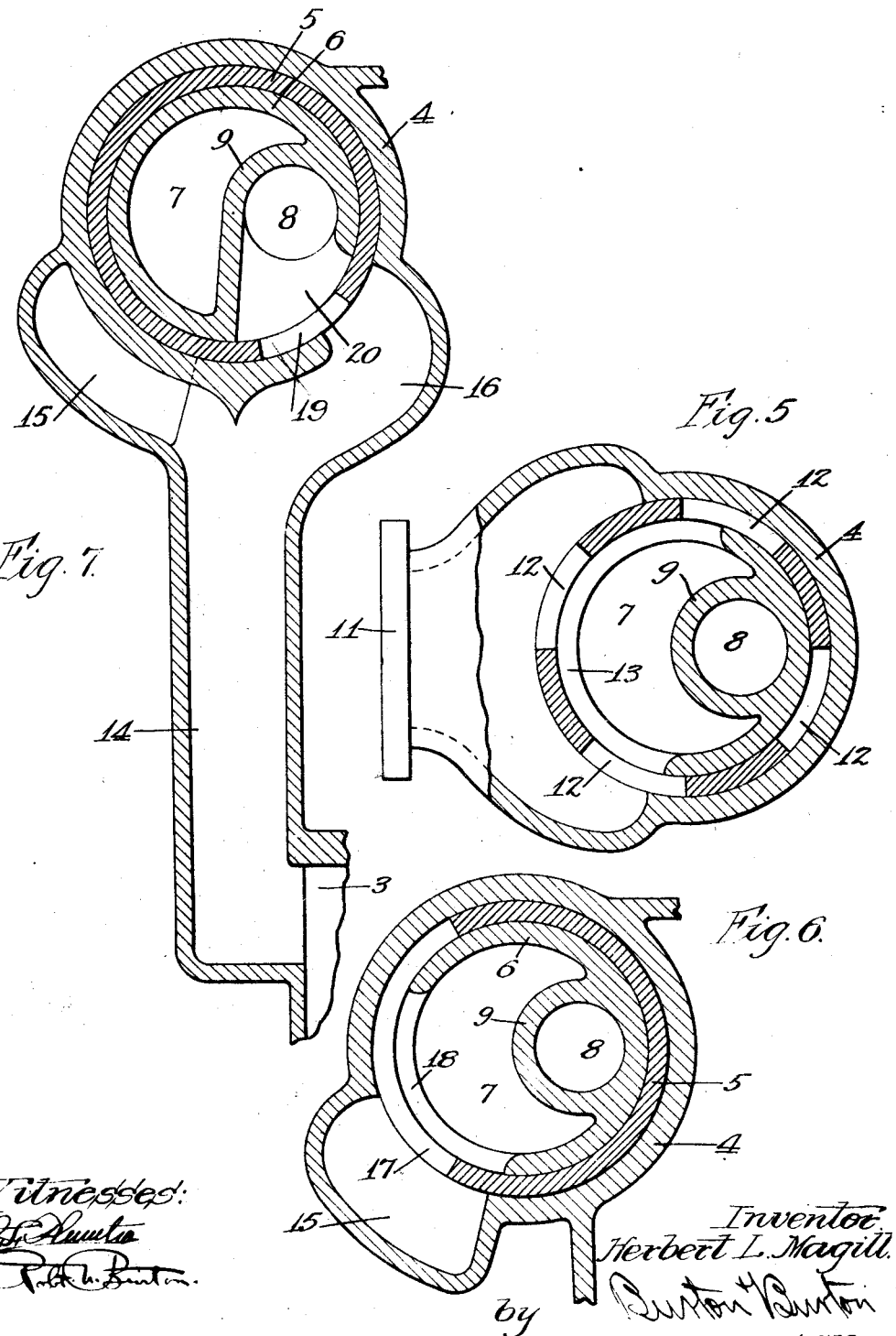

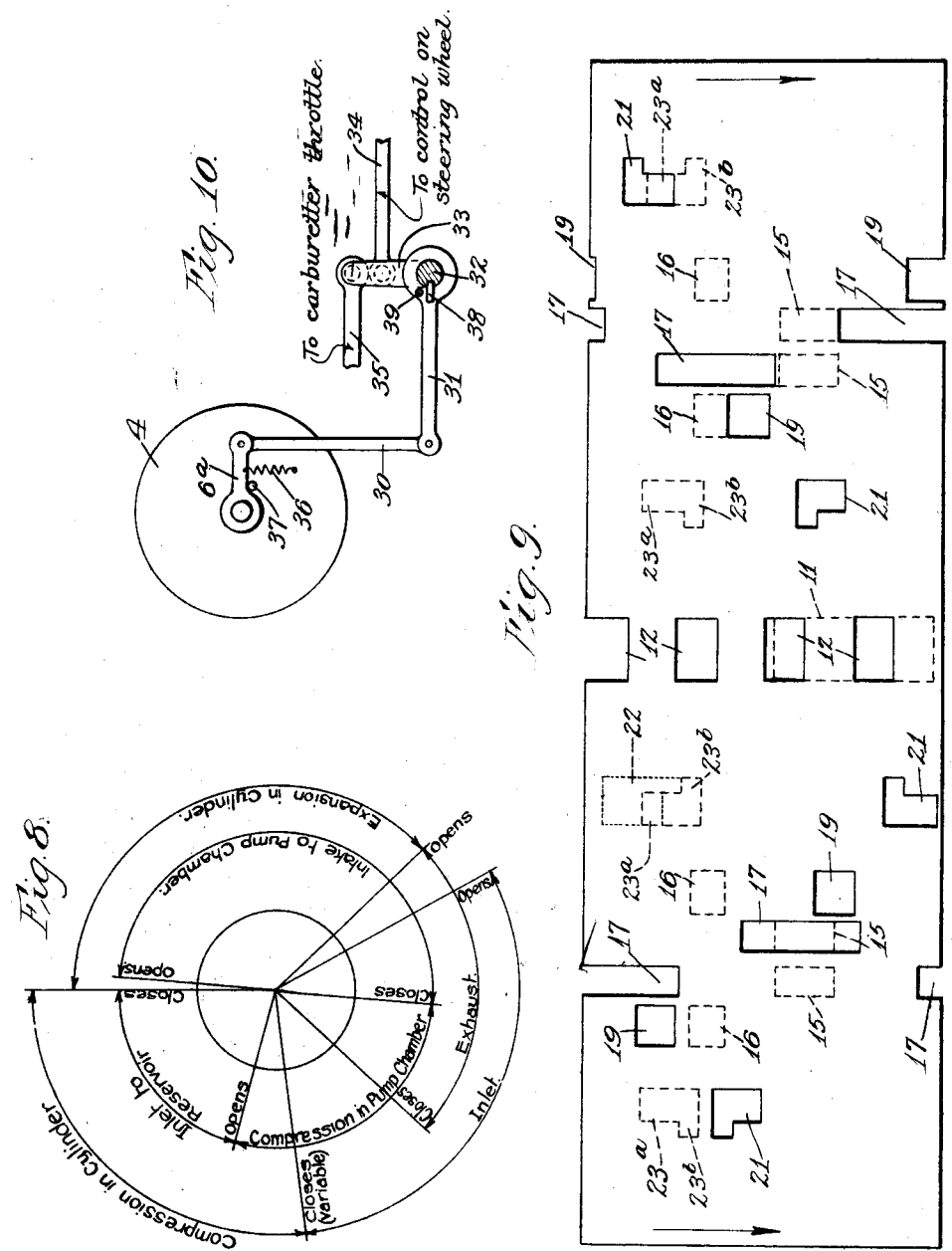

HERBERT L. MAGILL, OF CHICAGO, ILLINOIS.

INTERNAL-COMBUSTION ENGINE.

1,167,419. Specification of Letters Patent. Patented Jan. 11, 1916.

Application filed November 7, 1914. Serial No. 870,750.

*To all whom it may concern:*

Be it known that I, HERBERT L. MAGILL, a citizen of the United States, residing at Chicago, in the county of Cook and State of Illinois, have invented new and useful Improvements in Internal-Combustion Engines, of which the following is a specification, reference being had to the accompanying drawings, forming a part thereof.

This invention relates to improvements in internal combustion engines of the two-stroke cycle type and is especially concerned with the construction and operation of the valve mechanism.

It consists of the features and elements and their combinations described hereinafter and shown in the drawings, as indicated by the claims.

In the drawings: Figure 1 is a side elevation of a four-cylinder engine embodying this invention. Fig. 2 is a vertical section taken as indicated at 2—2 on Fig. 1. Fig. 3 is a plan section taken as indicated at line, 3—3, on Fig. 2. Fig. 4 is a plan section taken principally as indicated at line, 4—4, on Fig. 2, with a small portion taken at another plane indicated at line, *x*—*x*, on Fig. 2. Fig. 5 is a detail section taken as indicated at line, 5—5, on Fig. 3. Fig. 6 is a detail section taken as indicated at line, 6—6, on Fig. 3. Fig. 7 is a detail section taken as indicated at line, 7—7, on Fig. 3. Fig. 8 is a diagram indicating the cycle of operation of the various valves for any one cylinder of the engine. Fig. 9 is a developed view of the valve sleeve to indicate the location of the various port openings, and showing also in dotted lines the location of the various ports in the casing in which the valve sleeve rotates. Fig. 10 is a perspective view illustrating means for inter-connecting the timing sleeve control with the usual carbureter throttle control of the engine.

As is well understood it is usually necessary in so-called "two-cycle" type of explosive motor to provide for the compression of the gas elsewhere than in the firing chamber of the engine cylinder. By reference to Fig. 2 which is a transverse section of one cylinder of the engine illustrating this invention, it will be seen that in the present design the piston, 1, is provided at its lower end with a flange or extension, 2, while the lower end of the cylinder is bored out to form an annular chamber, 3, surrounding the cylindrical portion of the piston, 1, when it stands in the position illustrated, and serving as a compression chamber for the gas. The extension portion or compressor piston, 2, being rigidly associated with the piston, 1, travels up and down in the compression chamber, 3, as the engine piston travels up and down in its cylinder.

Journaled within a cylindrical casing, 4, at one side of the engine is the rotary valve sleeve, 5, and within it the rotatively adjustable timing sleeve, 6, whose interior is divided into two chambers, 7 and 8, respectively, by means of a partition wall, 9. The rotary valve sleeve, 5, is arranged to be driven from the engine crank shaft as by means of a chain, 10, and, as illustrated, is designed to rotate at crank-shaft speed and in the same direction, that is, clock-wise. The casing, 4, is provided, preferably near the middle of its length, with a mouth, 11, at which connection may be made with the engine carbureter, not shown, and the rotary valve member, 5, is formed with a series of ports, 12, arranged to register simultaneously with the mouth, 11, and with the port, 13, in the inner sleeve, 6, and so proportioned as to afford constant communication between the carbureter and the chamber, 7, of the inner sleeve during the rotation of the valve sleeve, 5. From each of the compression chambers, 3, a by-pass, 14, extends up to the cylindrical casing, 4, ending in two branches, 15 and 16, respectively, which are offset from each other longitudinally of the casing, 4.

Through the branch, 15, of its by-pass, 14, each of the pumping chambers, 3, is intermittently placed in communication with the chamber, 7, and thence with the carbureter through a port, 17, in the rotary valve sleeve, 5, registering with the port, 18, in the stationary sleeve, 6. As indicated in the diagram, (see Fig. 8), this occurs just after the compression piston, 2, begins its downward travel so that the suction created by the downward movement of the piston serves to draw fresh gas into the compression chamber, 3, from the carbureter. As the piston reaches the lower limit of its stroke, the chamber, 3, and by-pass, 14, are cut off from the chamber, 7, by rotation of the valve sleeve, 5, and by the upward movement of the piston, the gas therein is compressed. During the latter portion of the up-stroke of the piston, communication is opened between the branch, 16, of the by-pass, 14, and the chamber, 8, of the inner sleeve, 6, through one of the ports, 19, in the rotating valve sleeve, 5, registering with a port, 20, in the inner sleeve, 6. Thus the compressed gas is passed up into what may be termed the reservoir chamber, 8, of the inner cylinder, 6.

The ports, 12 and 13, are shown clearly in the enlarged detail section of Fig. 5; Fig. 6 shows the valve sleeve, 5, positioned with ports, 17 and 18, in registration, while Fig. 7 shows the valve sleeve, 5, rotated to the position at which the ports, 19 and 20, register to afford communication between the branch, 16, of the by-pass and the reservoir chamber, 8, of the timing sleeve, 6. All ports of the valve sleeve, 5, for all four cylinders of the engine illustrated are shown in their proper relation in the developed view of Fig. 9 which is taken looking at the inner surface of the sleeve as if unrolled into a plane. This view also shows in dotted line the relation at a given instant between the ports of the sleeve, 5, and the various openings in the casing, 4, in which it revolves.

By reference to the valve diagram, (Fig. 8), it will be seen that in a four-cylinder engine such as that illustrated in which the cranks are set 90 degrees apart, the reservoir, 8, will be kept constantly supplied with compressed gas. Through one of the ports, 21, in the valve sleeve, 5, registering with a corresponding port, 22, in the inner sleeve, 6, each of the cylinders in its proper order is supplied through its own inlet port, 23, with compressed gas from the reservoir, 8. The gas is exploded in the firing chamber, 24, and as the piston, 1, nears the lower limit of its downward stroke it uncovers the exhaust ports, 25, in the cylinder wall, permitting the burnt gas to escape into the exhaust manifold, 26. As shown in Figs. 2 and 4, each cylinder is provided with six exhaust ports, 25, spaced symmetrically around the cylinder wall, and opening into an annular passage way, 27, which in turn opens into the exhaust manifold, 26. By forming the partition walls, 28, as shown in Fig. 4, so that they all converge slightly in the direction of exit of the gas in the manifold, 26, the well-known effect of a ventura is obtained in the manifold, 26; that is, the velocity of the exhaust gas from any one cylinder in the desired direction through the manifold tends to create a suction which will assist the exhaust of any other cylinder, thus greatly facilitating the proper scavenging of the cylinders after each explosion.

Partly by virtue of the large area of the exhaust ports which this design affords and the perfect scavenging of the cylinders which results, it becomes practicable to open the inlet valve while the exhaust ports are still open, and in fact as shown on the diagram of Fig. 8, almost immediately after the exhaust ports open. Thus fresh gas is fed into the top of the cylinder as the burnt gas is drawn out from the lower portion, so that by the time the exhaust port closes, the cylinder is practically full of clean gas which has already been partly compressed and which is further compressed by the rise of the piston up to the instant of ignition.

It will be noted that with the timing sleeve, 6, set as shown in Fig. 2, the inlet port will open as the leading edge, 21$^a$, of the port, 21, in the valve sleeve, 5, passes the edge, 23$^a$, of the opening in the engine cylinder, while the time of closing of the port is controlled by registration of the opposite edge, 21$^b$, of the sleeve port, 21, and the edge, 22$^b$, of the port in the timing sleeve, 6. Thus by rotatively adjusting the sleeve, 6, in counter clock-wise direction, the time of inlet will be decreased, and by adjusting it oppositely the time may be increased up to a maximum at which the edge, 22$^b$, of the port, 22, is radially alined with the edge, 23$^b$, of the port, 23. Preferably, the timing sleeve, 6, will not be rotated any farther in this direction, but the time of opening of the inlet valve will be permanently adjusted in the initial assembling and testing of the engine by rotating the valve sleeve, 5, with respect to its driving gear, 29, and then rigidly securing it to the gear in the desired position of adjustment. As a result of this variable timing of the inlet valve, the actual quantity of gas introduced into the cylinder at each stroke may be determined to a nicety to suit the conditions of operation. Thus the longer the inlet port is open the greater will be the quantity of gas admitted into the firing chamber, and the greater will be the compression of said gas before ignition. But the variation in the timing of the inlet port and in the compression employed in the engine is not allowed to vary the capacity of the compressor, for the ports, 18 and 20, in the timing sleeve, 6, are circumferentially extended so as to completely lap the mouths of the by-pass branches, 15 and 16, at all positions of adjustment of the sleeve, 6, so that the control of these openings is effected entirely by the ports, 17 and 19, in the valve sleeve, 5, said ports being permanently fixed as to size and extent. As previously indicated, the earliest closing of the inlet valve is preferably made simultaneously with the closing of the exhaust port, and for reducing the speed of the engine below this point the carbureter throttle is relied upon entirely. That is, by throttling at the carbureter, not shown, a still smaller quantity of gas is admitted to the compressor and furnished therefrom to the cylinder, even though the inlet valve remains open until the exhaust port closes, so that a smaller charge of explosive fuel is furnished to the cylinder and consequently less power is developed therein. For increasing the speed the throttle at the carbureter is opened until the engine is handling the maximum quantity of fuel possible with the inlet valve closing simultaneously with the exhaust port. For increasing the speed or power, or both, above this point the timing sleeve, 6, is adjusted in clock-wise direction bringing the edge, 22$^b$, of its port, 22, nearer and nearer to the edge, 23$^b$, of the port, 23, in the cylinder, and since the valve sleeve, 5, rotates in clock-wise direction this has the effect of increasing the time during which the inlet port, 21, remains in registration with an open passage between the reservoir, 8, and the engine cylinder. To take care of this longer opening of the inlet valve the throttle valve of the carbureter, not shown, is opened enough wider to supply the requisite quantity of gas.

Preferably, the simultaneous control of the carbureter throttle valve and the timing sleeve, 6, of the inlet valve is accomplished by some such mechanical connection as that illustrated in Fig. 10, in which the rocker arm, 6$^a$, is rigidly connected with the timing sleeve, 6, (as shown in Fig. 3), and is coupled by a link, 30, to an arm, 31, loosely mounted on a rock shaft, 32. The rock shaft, 32, has rigid with it a rocker arm, 33, to which is connected the control rod, 34, and a link, 35, through which motion is communicated to the carbureter throttle valve for adjusting it. Adjustments of the carbureter throttle for obtaining the lower speeds of the engine do not in any way affect the position of the arm, 6$^a$, and its connected timing sleeve, 6; a spring, 36, holds the arm, 6$^a$, against the stop pin, 37, in which position the inlet valve of the engine closes simultaneously with the exhaust valve. But when the opening of the carbureter throttle reaches the point at which the maximum power is obtained with this opening of the inlet valve, then a pin, 38, in the rock shaft, 32, engages an abutment or pin, 39, in the hub of the arm, 31, thus effecting an operative connection between the throttle control device and the adjustment timing sleeve, 6, which serves to increase the time of opening of the inlet valve as the carbureter throttle is opened wider, and thus increasing the power obtainable in the engine over that obtainable in the usual two-cycle engine, in which it is impossible for the inlet valve to remain open after the exhaust port closes.

I claim:—

1. In a two-cycle gas engine, in combination with a cylinder having an exhaust port and an inlet port; gas-compressing means adapted to furnish gas at a pressure higher than the pressure in said cylinder at any time during the inlet period, and controlling means adapted to permit the inlet port to remain open after the closing of the exhaust port, and adjustable for varying the period during which said port remains open, together with means arranged to automatically vary the supply of gas to the compressing device in accordance with variations in said inlet period.

2. In a two-cycle gas engine, in combination with the cylinder and its inlet port, means for compressing the gas outside the firing chamber of the cylinder, a rotary valve sleeve controlling said inlet port and communicating with said compressing means, and a ported timing sleeve concentric with said valve sleeve and adapted for rotative adjustment with respect thereto in direction to vary the time of closing of the inlet valve.

3. In a two-cycle gas engine, in combination with the cylinder and its piston, an exhaust port in the cylinder wall positioned for control by the movement of said piston, an inlet port located at a higher position in said cylinder wall, and means for controlling said inlet port comprising a rotary valve sleeve, and a ported timing sleeve concentric therewith rotatably adjustable in direction for varying the time of closing of the inlet valve.

4. In a two-cycle gas engine in combination with the cylinder and its piston, an exhaust port in the cylinder wall positioned to be uncovered by the piston at the lower limit of its travel, an inlet port located at a higher position in said cylinder wall, and means for controlling said inlet port comprising a rotary valve sleeve, and a ported timing sleeve within said valve sleeve rotatively adjustable for varying the effective position of the port with respect to the valve sleeve.

5. In an internal combustion engine, in combination with a cylinder and its inlet port, a rotary valve sleeve controlling said port, and a gas supply reservoir within said sleeve having an opening which is rotatively adjustable with respect to the said inlet port for varying the timing of the valve.

6. In a two-cycle gas engine in combination with the cylinder and its inlet port, a rotary valve sleeve controlling said port, means for compressing the gas outside the firing chamber of the cylinder, a reservoir within said valve sleeve, and connections therefrom to said compressor, said reservoir having an opening opposite the cylinder inlet port and rotatively adjustable with respect thereto for varying the timing of the valve.

7. In a two-cycle gas engine, a rotary valve sleeve, a cylindrical member within said sleeve having two chambers, a gas compressor and a conduit leading therefrom terminating in two branches having mouths adjacent the said valve sleeve, said chambers of the inner cylindrical member having ports respectively opposite said mouths of the conduit, and the valve sleeve having a port adapted to register with each of said mouths during rotation of the sleeve for admitting gas to the compressor from one chamber and receiving it from said compressor into the other chamber of the inner cylinder.

8. In a two-cycle gas engine in combination with the cylinder and its inlet port, a rotary valve sleeve controlling said port, a cylindrical member within said sleeve having two chambers, a gas compressor and a conduit leading therefrom terminating in two branches having their mouths adjacent to said valve sleeve, said chambers of said inner cylindrical member having ports respectively opposite said mouths of the conduit, the valve sleeve having a port adapted to register with each of said mouths during rotation of the sleeve for admitting gas to the compressor from one chamber and receiving it from said compressor into the other chamber of the inner cylinder, said valve sleeve also having a port positioned to register with the inlet port of the engine cylinder, and said inner cylinder having a corresponding port registering with the inlet port of the cylinder, said inner cylinder being bodily rotatable for adjusting its port with respect to the inlet port of the cylinder for varying the timing of the inlet valve, and said other ports of the inner cylinder being circumferentially extended to avoid varying the timing of the compressor ports by rotative adjustment of said inner cylinder.

9. In an internal combustion engine in combination with the cylinder and its inlet port, a rotary valve sleeve controlling said port, a chambered member within said sleeve through which gas is supplied from the engine carbureter and which has an opening rotatively adjustable with respet to the inlet port of the engine cylinder for varying the timing of the inlet valve, means for so adjusting said member, and means operatively connected thereto for varying the amount of gas supplied by the carbureter.

10. In a two-cycle gas engine, a cylinder and its piston, an exhaust port in the cylinder wall adapted to be uncovered by the piston at the lower limit of its travel, an inlet port located at a higher position in said cylinder wall, a rotary valve sleeve controlling said inlet port, and a ported sleeve within said valve sleeve rotatively adjustable for varying the time of closing of said inlet port, in combination with the engine carbureter, means for controlling the amount of gas supplied therefrom, and operative connetions between said carbureter control and said adjustable timing sleeve for properly relating the supply of gas to the adjustment of the inlet valve.

11. In a two-cycle gas engine, in combination with a carbureter, the engine cylinder and its piston, an exhaust port in the cylinder wall controlled by the movement of said piston, an inlet port, and means other than said piston for controlling said inlet port, adapted to permit said port to remain open after the closing of the exhaust port, said inlet controlling means being adjustable to a position for closing the inlet simultaneously with the exhaust port, means for adjusting the engine carbureter to control the amount of gas supplied therefrom, and a lost motion connection therefrom to the inlet-adjusting means whereby the inlet is adjusted simultaneously with the carbureter through a portion of the carbureter adjustment range.

12. In a two-cycle gas engine, in combination with a carbureter, the engine cylinder and its inlet port, means for compressing the gas outside the firing chamber of the cylinder, a rotary valve sleeve controlling said inlet port, and a ported timing sleeve concentric with said valve sleeve adapted for rotative adjustment with respect thereto for varying the timing of the inlet valve, said valve sleeve having additional ports adapted to communicate with the carbureter and with the compressing means, respectively, said timing sleeve having corresponding ports adapted to register therewith but circumferentially extended to avoid varying the timing of said additional ports by rotative adjustment of said sleeve.

13. In a two-cycle gas engine in combination with the engine cylinder and its inlet port; means for compressing the gas outside the firing chamber of the cylinder; a rotary valve sleeve controlling said inlet port, and a ported timing sleeve concentric with said valve sleeve, adapted for rotative adjustment with respect thereto for varying the timing of the inlet valve, said valve sleeve having an additional port adapted to communicate with the compressing means, and said timing sleeve having a corresponding port adapted to register therewith but circumferentially extended to avoid varying the timing of said additional port by rotative adjustment of said sleeve.

In testimony whereof I have hereunto set my hand at Chicago, Illinois, this 2nd day of November, 1914.

HERBERT L. MAGILL.

Witnesses:
 ROBT. N. BURTON,
 EDNA M. MACINTOSH.